United States Patent

[11] 3,577,055

| [72] | Inventors | Fredrik Hermansson, deceased late of Sweden, by Ingrid Hermansson, Administrator, Vasteras, Sweden |
|---|---|---|
| [21] | Appl. No. | 734,062 |
| [22] | Filed | June 3, 1968 |
| [45] | Patented | May 4, 1971 |
| [73] | Assignee | Allmanna Svenska Elektriska Aktiebolaget Vasteras, Sweden |
| [32] | Priority | June 9, 1967 |
| [33] | | Sweden |
| [31] | | 8096/67 |

[54] MEANS FOR REGENERATIVE BRAKING OF AN IMPULSE-CONTROLLED DIRECT CURRENT SERIES MOTOR
1 Claim, 1 Drawing Fig.

[52] U.S. Cl............................................................ 318/302, 318/370, 318/376, 318/380
[51] Int. Cl............................................................ H02p 5/04

[50] Field of Search............................................ 318/(Cursory), 370, 302, 380, 379, 376

[56] References Cited
UNITED STATES PATENTS

| 3,250,978 | 5/1966 | Moscardi.................... | 318/302 |
| 3,325,714 | 6/1967 | Yasunosuke................ | 318/376 |
| 3,398,343 | 8/1968 | Plumpe, Jr.................. | 318/376 |

*Primary Examiner*—Benjamin Dobeck
*Assistant Examiner*—K. L. Crosson
*Attorney*—Jennings Bailey, Jr.

ABSTRACT: An arrangement for regenerative braking of a thyristor-controlled DC series motor used as driving motor for street cars. During braking possible excess energy is consumed by a resistor connected in parallel with the motor. The resistor is connected in series with a switching means for connecting and disconnecting the resistor at an upper and lower voltage level, respectively.

PATENTED MAY 4 1971
3,577,055
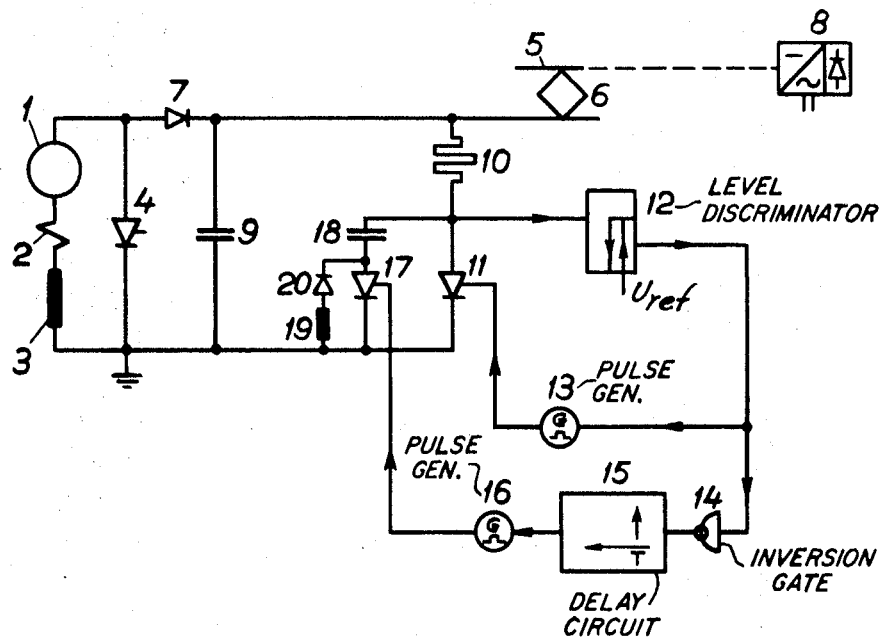
INVENTOR
FREDRIK HERMANSSON, DECEASED
BY: INGRID HERMANSSON, ADMINISTRATRIX
BY
Jennings Bailey Jr

MEANS FOR REGENERATIVE BRAKING OF AN IMPULSE-CONTROLLED DIRECT CURRENT SERIES MOTOR

BACKGROUND OF THE INVENTION

1. Field of the Invention

The present invention relates to an arrangement for regenerative braking of an impulse-controlled direct current series motor used as driving motor for vehicles supplied with energy from a direct voltage network, for example street cars.

2. The Prior Art

Speed control of a DC series motor can be arranged practically without losses by supplying the network voltage to the motor in the form of pulses with the help of a thyristor which is periodically ignited and extinguished. By varying the length of the pulses, the mean value of the voltage is varied and thus the speed of the motor. During braking the thyristor is connected in parallel to the motor which then operates as a generator and the power supplied from the motor, and thus the braking power, can be smoothly controlled by ignition and extinction of the thyristor.

With battery driven vehicles where this operating method is used it is possible without difficulty to arrange regenerative braking, whereby the braking energy is used to charge the batteries. With vehicles such as street cars and the like, however, which are supplied with energy from a direct current network fed through noncontrollable rectifiers, regenerative braking cannot always be effected. The energy cannot be fed back to the alternating current network, and a first condition for feeding back to the direct current network to be possible, is that the network must be loaded so that the current fed out can be received by other load objects. Furthermore, the current collector should not bounce during braking, neither should braking occur in parts of the network which are voltageless, for example at the junction between two conducting sections which are not connected. In practice it is impossible to fulfill such requirements and it is therefore usual in tram networks of the type described here to completely refrain from regenerative braking. The present invention, however, makes it possible to advantageously use regenerative braking in these networks also.

SUMMARY OF THE INVENTION

The device proposed according to the invention for regenerative braking of an impulse-controlled direct current series motor comprises, as do previously known devices, a thyristor parallel-connected to a motor and the motor is connected to the feeding direct current network by means of a diode, a capacitor lying parallel across the series-connection of motor and diode, in the following called a buffer-capacitor. The new device is characterized in that a resistor is connected in parallel across the buffer-capacitor, said resistor being in series with a switching means provided with control members for connecting the resistor at an upper level of the capacitor voltage and disconnecting it a certain time interval thereafter. This means that only the excess energy, that is the difference between the electrical braking energy and the energy which the direct current network can absorb at a given moment, is lost in the resistor.

Said connecting means with its control members suitably consists of a second thyristor provided with firing and extinguishing circuits. This has the advantage, among other things, in comparison with, for example, an electromagnetic switching device, that the circuit can be activated instantaneously and thus enables uninterrupted electrical braking.

The primary part of said control member may with advantage consist of a so-called level detector arranged to sense the voltage across the buffer-capacitor. When regenerative operation is not possible the voltage across this capacitor will rapidly increase above the maximum network voltage arising during normal operation. A clear signal can thus be obtained from the level detector, which fires the second thyristor and, after a certain time determined by a time-lag circuit, extinguishes the same thyristor.

BRIEF DESCRIPTION OF THE DRAWINGS

The accompanying drawings show schematically an embodiment of the invention.

DESCRIPTION OF THE PREFERRED EMBODIMENTS

In the drawing 1 designates a direct current series motor which is used as a driving motor for a street car. By means of switching means, not shown, the motor and the circuit elements pertaining to this motor can be switched between speed and braking connections. However, the drawing shows only the braking connection. The motor 1 is series-connected by its field winding 2 to a smoothing reactor 3. Parallel across the motor 1 and the smoothing reactor 3 is a thyristor 4, provided with firing and extinguishing circuits, not shown. As with most of the other circuit elements shown in the drawing, the thyristor 4 may consist of several parallel or series-connected elements. The motor is connected to a direct current network 5 by means of a current collector 6 and a diode 7. The diode prevents the direct current network from being short-circuited across the thyristor 4. The direct current network 5 is in the form of an overhead power transmission line which is fed by a rectifier station 8. The nominal voltage of the network may be, for example, 660 v. A capacitor 9, the so-called buffer-capacitor, lies in parallel across the series-connection of the motor 1 and the diode 7. In order to absorb the excess energy developed during regenerative braking the connection previously described, known per se, is complemented by a braking resistor 10 series-connected with a thyristor 11. The resistance value of the resistor 10 is determined by the maximum permitted voltage and the highest motor current arising at braking. To control the thyristor 11 a level detector 12 is arranged, the output of which is connected by means of a first pulse generator 13 to the ignition electrode of the thyristor 11 and by means of an inversion gate 14, a delay circuit 15 and a second pulse generator 16 to the ignition electrode of an extinguishing thyristor 17. This extinguishing thyristor is included in an extinguishing circuit known per se comprising an extinguishing capacitor 18, an inductance coil 19 and a diode 20.

During braking the braking effect is controlled by ignition and extinction of the thyristor 4. When the thyristor 4 is fired, the motor 1 is short-circuited and the motor current increases. When the motor current is sufficiently high the thyristor is blocked and, due to the inductance in the motor circuit, the current flows on to load objects for instance other street cars, connected in the network so that the current decreases again. By altering the relative connection time of the thyristor 4 it is possible to gradually alter the effective load resistance and thus the braking force. The braking energy can be fed back to the direct current network 5, assuming that this is loaded by other objects which can absorb the energy generated by the motor. Under such operation the thyristor 11 is blocked. If, however, braking takes place when the network cannot accept the braking energy, the voltage will increase with a speed determined by the size of the buffer-capacitor 9 and the motor current. Since the capacitance of the buffer-capacitor is usually relatively small, this voltage increase will take place extremely rapidly. The voltage across the buffer-capacitor is sensed by the level detector 12 and compared with a reference voltage $U_{ref}$. When the capacitor voltage exceeds said reference voltage a signal is obtained on the output side of the level detector. This signal is sued to start the pulse generator 13 which in turn emits firing pulses to the thyristor 11 which then connects in the braking resistor 10. Simultaneously a signal is also given to return the time-lag circuit 15. When the thyristor 11 ignites, however, this signal is inverted and after a time T the time-lag circuit emits a signal to the pulse generator 16 which sends firing pulses to the extinguishing thyristor 17 of the circuit. The time T is determined by the resistance of the resistor 10, the capacitance of the capacitor 9 and the difference between the mentioned reference voltage, which may be, for example, 750 v., and the maximum network voltage, for example 700 v., arising in normal operation. Before the thyristor 11 ignites the capacitor 18 has been charged to the network voltage by means of the extinguishing thyristor 17 with plus potential on the upper capacitor plate. When the thyristor 11 ignites, however, the capacitor 18 will be recharged by means of the inductance coil 19 and the diode 20 so that the capacitor obtains plus potential on its lower plate. When now the extinguishing thyristor 17 ignites, the voltage of the capacitor 18 will be placed as a blocking voltage across the thyristor 11 so that this is extinguished. The capacitor 18 is thus recharged with plus potential on its upper plate. Since the thyristor 11 is now extinguished, the motor 1 can again start to feed energy to the network 5 if the network can absorb the energy. Otherwise the voltage across the capacitor 9 will increase and the braking resistor 10 be connected again as described above.

For the sake of clarity the embodiment has been shown schematically by omitting members which have no direct connection with the invention, for example the apparatus necessary for the switching between speed and braking connection. Furthermore, the electronic circuits in the control equipment for the thyristor 11, such as the level detector 12, time-lag circuit 15 and pulse generators 13 and 16, have not been shown in detail. These circuits may be designed in several different ways, known per se.

It is claimed:

1. An arrangement for regenerative braking of an impulse-controlled direct current series motor, said motor being reversible between a speed connection and a braking connection, said motor in said braking connection being connected in parallel with a thyristor and connected to a direct current network through a diode, a capacitor connected in parallel across the series-connection of said motor and said diode, a series-connection of a resistor and a switching means connected in parallel with said capacitor, said switching means comprising a second thyristor provided with firing and extinguishing means, control means for said switching means, said control means comprising a level detector and a time delay circuit, said level detector including means responsive to the voltage across said capacitor, when said voltage is at an upper level, to generate a signal to effect firing of said second thyristor and, after a certain time interval determined by said time delay circuit, to extinguish said second thyristor.